United States Patent Office 3,136,745
Patented June 9, 1964

3,136,745
ELASTOMERIC COPOLYMERS OF VINYLIDENE FLUORIDE AND PERFLUOROALKYL PERFLUOROVINYL ETHERS
Jerry Richard Albin, Wilmington, Del., and George Arthur Gallagher, Media, Pa., assignors to E. I. du Pont de Nemours and Company, Wilmington, Del., a corporation of Delaware
No Drawing. Filed June 23, 1961, Ser. No. 119,022
4 Claims. (Cl. 260—87.7)

This invention is directed to elastomeric copolymers of perfluoroalkyl perfluorovinyl ethers and vinylidene fluoride, which copolymers show excellent low-temperature properties as well as good thermal stability.

Polymeric materials derived from certain fluorine-containing monomers have become well known for their outstanding physical properties, in particular, for their good thermal stability. Advancing technology is, however, constantly widening the temperature range over which materials are needed to perform.

It is, therefore, an object of this invention to provide a novel elastomeric material having excellent low-temperature flexibility to permit a wider operating temperature range.

It is a further object of this invention to provide novel copolymers having significant thermal stability.

These and other objects will become apparent in the following description and claims.

More specifically, the present invention is directed to an elastomeric copolymer consisting of the following monomer units: (a) 83 to 25 mol percent of vinylidene fluoride units, ($-CH_2-CF_2-$); (b) 17 to 75 mol percent of perfluoroalkyl perfluorovinyl ether units,

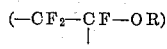

in which ether units R is a perfluoroalkyl radical containing 1 to 3 carbon atoms.

The perfluoroalkyl perfluorovinyl ethers that may be used in the preparation of the copolymers of this invention have the general structure $R-O-CF=CF_2$ in which R is a perfluoroalkyl group having one to three carbon atoms. This includes perfluoromethyl perfluorovinyl ether, perfluoroethyl perfluorovinyl ether, and perfluoropropyl perfluorovinyl ether or mixtures of any of these. The preferred monomer is perfluoromethyl perfluorovinyl ether because the copolymers prepared from this compound in general show the most desirable properties. In general, lengthening the perfluoroalkyl chain of the perfluorovinyl ether serves no useful purpose, and perfluoroalkyl groups having more than three carbon atoms are undesirable since the resulting copolymers are relatively inferior in thermal stability and are more costly.

These perfluoroalkyl perfluorovinyl ethers may be prepared by the pyrolysis of 2-(perfluoroalkoxy)perfluoropropionic acid or derivatives thereof. This acid has the following structure

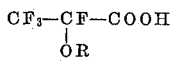

where R has the same meaning as above. In a preferred method, the ethers are prepared by pyrolysis of the alkali metal salt of the 2-(perfluoroalkoxy)perfluoropropionic acid at a temperature in the range of 100 to 250° C. The dry salt by itself may be pyrolyzed, in which case a temperature of 170 to 250° C. is used. The pyrolysis may also be carried out in the presence of polar or nonpolar solvents. In the presence of polar solvents, such as 1,2-dimethoxyethane and benzonitrile, the decomposition is generally carried out at temperatures of 100 to 180° C.

The 2-(perfluoroalkoxy)perfluoropropionic acids, which are starting materials for the perfluoroalkyl perfluorovinyl ethers, may be prepared in various ways. In a preferred method, it is prepared by reaction of a perfluorinated acid fluoride such as carbonyl fluoride, perfluoroacetyl fluoride, or perfluoropropionyl fluoride, with hexafluoropropylene oxide in the presence of a catalyst and in a polar solvent containing no highly active hydrogen atom. The reaction is catalyzed by activated carbon, alkali metal fluorides, silver fluoride or quaternary ammonium fluorides. Examples of suitable solvents are acetonitrile, benzonitrile, dialkyl ethers of ethylene glycol or diethylene glycol, N-methyl-2-pyrrolidone, dimethyl sulfoxide, etc. The reaction is carried out at temperatures ranging from −80 to 200° C.

The presence of the vinylidene fluoride unit is an essential feature of the copolymers of this invention, both to provide curability and to insure the desired combination of properties. Copolymers of the perfluoroalkyl perfluorovinyl ether with a hydrogen-containing olefin other than vinylidene fluoride, such as vinyl fluoride and trifluoroethylene, have poor low temperature flexibility, poor thermal stability, or both.

When the copolymers contain more than about 83 mol percent of vinylidene fluoride units, they lose their outstanding low-temperature flexibility. They also become more plastic in nature. Copolymers containing less than about 25 mol percent of vinylidene fluoride are more difficult to cure.

The preferred copolymers are those which contain about 72 to 80 mol percent of vinylidene fluoride units and about 28 to 20 mol percent of perfluoroalkyl perfluorovinyl ether units.

The copolymers of this invention are prepared by copolymerizing a mixture of the monomers using known techniques. The polymerization may be carried out in bulk or in the presence of an inert diluent such as water or a perfluorinated solvent, such as perfluorodimethylcyclohexane. It is preferred to use an aqueous medium. When using an aqueous medium, it is helpful to use an emulsifying agent such as the ammonium salt of long-chain fluorinated carboxylic acids. Examples of such emulsifying agents are ammonium perfluorocaprylate and ammonium omega-hydroperfluoroheptanoate. The use of the emulsifying agent is necessary if it is desired to obtain the copolymers in the form of a stable latex. The emulsifying agent should be used in amounts ranging from about 0.05 percent to about 5.0 percent by weight, based on amount of monomers used in the polymerization.

Polymerization is initiated by means of a conventional free-radical polymerization initiator. A well-known class of polymerization initiators are the compounds containing the peroxy linkage. Examples of these are hydrogen peroxide, benzoyl peroxide, cumene hydroperoxide, and water-soluble salts of persulfuric acid, such as sodium persulfate, potassium persulfate, and ammonium persulfate. The preferred initiator is ammonium persulfate because of its low cost. Other types of free-radical polymerization initiators which may be used are the azo compounds disclosed in U.S. 2,471,959 such as 2,2'-azobis(2-methylpropionitrile) and nitrogen fluorides. The amount of polymerization initiator used will depend on many factors including the initiator nature, the medium, the temperature, etc. Normally, not less than about 0.001 percent and not more than about 15 percent, based on total weight of monomers, is used. In the preferred system, the amount of ammonium persulfate will range from about 0.05 to about 5 percent.

The polymerization is normally carried out under pressure at moderately elevated temperatures. The preferred temperature ranges from about 50° C. to 120° C. Lower temperatures may be used, but the polymerization will proceed more slowly. Likewise, higher temperatures may be used with a corresponding increase in polymerization rate. The pressures used will depend somewhat on the composition of the polymer which is desired. Copolymers containing up to about 55 mol percent of the perfluoroalkyl perfluorovinyl ether units may be prepared using the preferred aqueous system under autogenous pressures, preferably in the range of about 200 to about 1200 p.s.i.g., although higher or lower pressures may be used if desired. When copolymers containing more than about 55 mol percent of the perfluoroalkyl perfluorovinyl ether are prepared, a bulk polymerization technique is preferably used, and pressures in the range of about 10,000 to about 50,000 p.s.i.g. are preferred, although, again, higher or lower pressures may be used. The polymerization should be carried out in the absence of oxygen.

If desired, the molecular weight of the copolymers may be modified by the addition to the polymerization system of a chain-transfer agent such as n-hexane, carbon tetrachloride, acetone, or ethyl acetate. The amount used will depend on the molecular weight desired, the activity of the chain-transfer agent, and the polymerization temperature. Usually not less than 0.001% and not more than 1% of chain-transfer agent is used on the amount of monomers used. If a very low-molecular-weight copolymer is desired, the chain-transfer agent may be used as the polymerization medium. The polymerization may be carried out by a batch or by a continuous process. The properties of the copolymer will vary somewhat depending on the conditions and the type of process used. Conventional methods of isolating the copolymers are used.

The copolymers prepared in accordance with this invention are elastomers having outstanding low-temperature flexibility combined with good thermal stability. Their stiffening points, determined by the Clash-Berg test (ASTM D1043–51), are in the range −23 to −31° C. For comparison, the commercially available fluoroelasomers prepared from vinylidene fluoride and hexafluoropropene have stiffening points in the range of −18 to −12° C. At the same time, the copolymers of this invention are at least equivalent in thermal stability to the known fluoroelastomers. The cured copolymers of this invention require at least 70 hours at 288° C. to lose 10 percent of their weight and most of them require 100 to 170 hours. For comparison, commercially available fluoroelastomers prepared from vinylidene fluoride and hexafluoropropene lose 10 percent of their weight in 50 to 120 hours.

The copolymers of this invention are highly useful for a wide variety of applications. They may be used in the uncured state or they may be compounded, fabricated, and cured in the same way as known fluoroelastomers. Suitable curing agents are hexamethylenediamine carbamate, benzoyl peroxide, high energy radiation, N,N'-bis(arylalkylidene)alkylenediamines, aliphatic and cycloaliphatic diamines, and organic dimercaptans in conjunction with aliphatic tertiary amines. An acid acceptor such as magnesium oxide or zinc oxide is used in combination with the curing agents. The copolymers may be compounded with conventional elastomer compounding agents such as carbon black, silica, and pigments, using conventional rubber compounding techniques.

The copolymers of this invention may be used in any of the applications for which the known fluoroelastomers are generally used. This includes such uses as in molded goods, such as O-rings, packings and seals; for coated fabrics to be used in fuel cells, diaphragms, and protective clothing; for hose, for wire insulation; and for protective coatings. Low-molecular-weight copolymers may be used as heat-resistant plasticizers for solid fluoroelastomers. Copolymers falling within the scope of this invention possess a unique combination of high-temperature stability and low-temperature flexibility which makes them particularly suitable for applications in which they will be subjected to both extremes of temperature.

Representative examples illustrating the present invention follow.

The preparation and evaluation of the polymers in the examples which follow are carried out as described below:

A. PREPARATION OF POLYMERS

Conditions used for effecting the copolymerization are as follows:

Into a 400-ml. Hastelloy C bomb are placed the desired amounts of ammonium persulfate, ammonium perfluorocaprylate, and deoxygenated distilled water while maintaining the whole operation under a blanket of nitrogen. After closing the bomb and freezing for 10–15 minutes in a "Dry Ice"-acetone bath (about −78° C.) it is evacuated to a pressure of less than 1 mm. Hg.

The desired monomers, preweighed into loading cylinders, are then added to the exacuated, cold bomb in order of their boiling points, starting with the highest boiling material.

The loaded bomb is then placed in a shaker unit and heated to 60° C. while shaking in a reciprocal motion at 180 cycles per minute. Heating and shaking is continued for two hours after the last observable pressure drop and is then discontinued.

After cooling to room temperature, any small amount of residual gas is recovered by attaching an evacuated cylinder, cooled to about −78° C. to the bomb. The contents of the bomb are then removed.

The bomb contents, usually in the form of an emulsion, are placed in a stainless steel beaker which is partially immersed in a "Dry Ice"-acetone bath until the contents are frozen sold. Upon warming the beaker and contents to room temperature, the copolymer is obtained as a coagulum.

The aqueous material is removed by filtration to remove the bulk of initiator and emulsifier residues. The coagulum is then washed with 200-ml. portions of distilled water using an Osterizer blender until two successive washes are acid free. The wet coagulum is dried in a vacuum oven at 70° C.

The inherent viscosity of the polymer is measured at 30° C. using a solution of 0.1 gram of copolymer in 100 ml. of a mixture consisting of 87 parts of tetrahydrofuran and 13 parts of N,N-dimethylformamide.

B. POLYMER EVALUATIONS (1) *Raw film.*—The films are made by compressing one to two grams of the dry raw copolymer between two aluminum sheets for one to two minutes at 150° C. and a pressure of 2,000 pounds per square inch.

(2) *Vulcanized strips.*—Ten grams of the raw copolymer is worked on a 2" x 6" two-roll rubber mill, and the compounding ingredients are milled in using conventional rubber-compounding techniques. The recipe used is:

| | Parts by weight |
|---|---|
| Copolymer | 100. |
| Magnesium oxide | 15. |
| Medium thermal carbon black | 20. |
| Hexamethylenediamine carbamate | As indicated. |

The compounded strips are placed in a standard

1″ x 5″ x 0.075″ cavity mold and heated at 150° C. for 0.5 to 1 hour while maintaining the mold under a pressure of 1,000–4,000 pounds per square inch. The time of the press cure is indicated in the examples. The mold is then cooled under pressure by passing cold water through the press platens, and the molded slab is removed. The cure is completed by placing the slabs in an oven, heating from 25° C. to 204° C. over a period of 2 hours and then heating at 204° C. for 18 to 24 hours. Strips of one-quarter inch width are cut from the slabs for testing.

(3) The copolymers are tested as follows:

Stress-strain properties are obtained by pulling a strip on an Instron tester at a rate of 10 inches per minute at 25° C.

To determine resistance to thermal degradation, strips one-quarter inch in width are hung for 48 hours in a circulating air oven heated to 288° C. The strips are then cooled to room temperature and the stress-strain properties obtained as described above. Also the length of time required for samples of both the raw and the cured polymer to lose 10 percent of their original weight when submitted to a temperature of 288° C. is observed.

Low-temperature properties are obtained qualitatively by placing the raw film or a bent loop of the vulcanizate (made by joining the ends of a strip of dimension 0.075 x 5 x 0.25 inch) in a freezer maintained at −25° C. for 24 hours and observing the degree of rigidity. quantitative measurements are made by the Clash-Berg test (ASTM D1043–51), results of which are expressed in the temperature, ° C., at which the modulus of the sample, on gradual cooling, reaches 6,000 p.s.i. (stiffening point).

Example 1

Using the general procedure described in paragraph A above, 350 ml. of water, 0.53 g. of ammonium persulfate, and 0.14 g. of ammonium perfluorocaprylate are charged to the bomb. The monomers charged are 6.4 g. of vinylidene fluoride and 14.2 g. of perfluoromethyl perfluorovinyl ether, a weight ratio of monomers of 31/69 which is a molar ratio of 54/46. The time between the start of the reaction and the last observed pressure drop is 0.75 hour. The maximum pressure attained is 250 p.s.i.g. and the pressure drop is 250 p.s.i.g. There are no off gases. The product weighs 18.6 g. and is a rubbery polymer having an inherent viscosity of 0.76.

Analysis of the product shows that it contains 25.9 percent carbon, which indicates that the copolymer has a composition, by weight, of 27 percent of vinylidene fluoride units and 73 percent of perfluoromethyl perfluorovinyl ether units, which corresponds to a molar ratio of these units of 49/51. The raw copolymer is flexible at −25° C. and requires 200 hours at 288° C. to lose 10 percent of its weight.

The elastomer is cured by the method of paragraph B above using 2 parts of hexamethylenediamine carbamate and a press-cure of 60 minutes. The cured copolymer requires 113 hours at 288° C. to lose 10 percent of its weight. The stiffening point by the Clash-Berg test is −28° C.

Example 2

Using the general procedure described in paragraph A above, 360 ml. of water, 0.53 g. of ammonium persulfate, and 0.14 g. of ammonium perfluorocaprylate are charged to the bomb. The monomers charged are 8.9 g. of vinylidene fluoride at 9.5 g. of perfluoromethyl perfluorovinyl ether, a weight ratio of 48/52 which is a molar ratio of 71/29. The time between the start of the reaction and the last observed pressure drop is 1.5 hours. The maximum pressure attained is 320 p.s.i.g. and the pressure drop is 250 p.s.i.g. There is 0.8 g. of off-gas, corresponding to 4.3 percent of the weight of monomers charged. The product weighs 13.7 g. and is a rubbery copolymer having an inherent viscosity of 1.00.

Analysis of the product shows that it contains 29.9 percent carbon, which indicates that the copolymer has a composition, by weight, of 52 percent of vinylidene fluoride units and 48 percent of perfluoromethyl perfluorovinyl ether units, which corresponds to a molar ratio of these units of 74/26.

The raw copolymer is flexible at −25° C. and requires 205 hours to lose 10 percent of its weight.

The copolymer is cured by the method of paragraph B above using 1 part of hexamethylenediamine carbamate and a press-cure of 30 minutes. The cured copolymer requires 101 hours to lose 10 percent of its weight. The stiffening point by the Clash-Berg test is −29° C.

The tensile properties of the cured copolymer are:

|  | Original | After heat aging |
|---|---|---|
| Tensile strength at the break, p.s.i. | 910 | 480 |
| Elongation at break, percent | 640 | 570 |
| Modulus at 200− elongation, p.s.i. | 380 | 210 |

Example 3

Using the general procedure described in paragraph A above, 250 ml. of water, 0.53 g. of ammonium persulfate, and 0.14 g. of ammonium perfluorocaprylate are charged to the bomb. The monomers charged are 12.3 g. of vinylidene fluoride and 12.8 g. of perfluoropropyl perfluorovinyl ether, a weight ratio of 49/51 which is a molar ratio of 80/20. The time between the start of the reaction and the last observed pressure drop is 1.25 hours. The maximum pressure attained is 225 p.s.i.g. and the pressure drop is 225 p.s.i.g. There are no off-gases. The product weighs 22.4 g. and is a rubbery copolymer having an inherent viscosity of 0.53. The raw copolymer requires 78 hours at 288° C. to lose 10 percent of its weight. Analysis of the product shows that it contains 30.1 percent carbon, which indicates that it is a copolymer containing, by weight, 50 percent of vinylidene fluoride units and 50 percent of perfluoropropyl perfluorovinyl ether units, which corresponds to a molar ratio of these units of 81/19.

The copolymer is cured by the method of paragraph B above using 1.5 parts of hexamethylenediamine carbamate and a press-cure of 30 minutes. The cured polymer requires 73 hours to lose 10 percent of its weight at 288° C. and has a stiffening point in the Clash-Berg test of −24° C.

Example 4

Using the general procedure described in paragraph A above, 350 ml. of water, 0.53 g. of ammonium persulfate, and 0.14 g. of ammonium perfluorocaprylate are charged to the bomb. The monomers charged are 12.2 g. of vinylidene fluoride and 8.3 g. of perfluoromethyl perfluorovinyl ether. The time between the start of the reaction and the last observed pressure drop is 1 hour. The maximum pressure attained is 350 p.s.i.g. and the pressure drop is 350 p.s.i.g. There are no off-gases. The product weighs 16 g. and is a rubbery copolymer having an inherent viscosity of 1.00. Analysis of the product shows that it contains 30.8 percent carbon, which indicates that the copolymer has a composition, by weight, of 58 percent of vinylidene fluoride units and 42 weight percent of perfluoromethyl perfluorovinyl ether units, which corresponds to a molar ratio of these units of 78/22.

The raw copolymer is flexible at −25° C. The copolymer is cured by the method of paragraph B above using 1.5 parts of hexamethylenediamine carbamate and a press-cure of 30 minutes. It requires 100 hours at 288°

C. to lose 10 percent of its weight. The stiffening point by the Clash-Berg test is −31° C.

*Example 5*

PREPARATION OF 2-(PERFLUOROMETHOXY) PERFLUOROPROPIONYL FLUORIDE 30 grams of cesium fluoride and 75 ml. of diethyleneglycol dimethyl ether are charged to a 320 ml. stainless steel autoclave, and the vessel is cooled to −80° C. After evacuating the vessel, 66 grams of carbonyl fluoride and 83 grams of hexafluoropropylene oxide are charged to the autoclave and the vessel is heated to 75° C. for 4 hours. Distillation of the resulting product affords 82 grams of 2-(perfluoromethoxy)perfluoropropionyl fluoride, B.P. 10–12° C.

The corresponding 2-(perfluoroethoxy) and 2-(perfluoropropoxy)perfluoropropionyl fluorides are prepared in a similar fashion except that perfluoroacetyl fluoride and perfluoropropionyl fluoride, respectively, are used instead of carbonyl fluoride.

*Example 6*

PREPARATION OF PERFLUOROMETHY PERFLUOROVINYL ETHER

A reaction vessel, consisting of a polyethylene bottle with a "Dry Ice" condenser attached, is charged with 201 grams of 2-(perfluoromethoxy)perfluoropropionyl fluoride. There is then added 30 grams of water. The reaction mixture is neutralized to a phenolphthalein end point with 10 N potassium hydroxide in water and is then evaporated to dryness at 25° C. The dry mixture of the potassium salt of the acid and potassium fluoride is further dried in a vacuum at 100° C. The salt mixture is charged to a glass reaction vessel attached to a trap cooled by "Dry Ice." The vessel is heated to 185–215° C. for 24 hours. Distillation of the condensate collected in the trap affords 115 grams of perfluoromethyl perfluorovinyl ether.

*Example 7*

Perfluoromethyl perfluorovinyl ether (21.6 grams) and vinylidene fluoride (2.5 grams) are mixed in a one-gallon stainless steel cylinder and allowed to equilibrate for four days. The gas is then divided into three approximately equal portions by distilling 8.6 grams and 7.6 grams, respectively, into two one-liter stainless steel cylinders. All of the cylinders are then allowed to equilibrate for three days.

The contents of each cylinder is transferred by distillation into platinum tubes, closed at one end, each having a capacity of 11 milliliters. These tubes are cooled with liquid nitrogen. The desired amount of nitrogen difluoride is then added and each tube is sealed. The contents of each tube is as follows:

| Tube | N₂F₂, grams | Gas mixture, grams |
|---|---|---|
| 1 | 0.025 | 8.6 |
| 2 | 0.025 | 7.6 |
| 3 | 0.013 | 7.9 |

The tubes, cooled in liquid nitrogen, are transferred to a high pressure bomb which is then heated to 60° C., pressured with helium to about 45,000 p.s.i.g. and held at that temperature and pressure for six hours.

After cooling to 25° C., the tubes are cut open and the contents removed. Tubes 1 and 2 contain oils (2.1 and 2.3 grams, respectively) and tube 3 contains 1.5 grams of a white sticky polymer. The products are each dissolved in perfluorodimethylcyclohexane, the solutions are filtered, and the solvent is removed under vacuum.

Analysis of the polymers indicate the compositions shown below:

| Tube | Inherent viscosity [1] | Percent C | Composition | |
|---|---|---|---|---|
| | | | Weight percent vinylidene fluoride/PMVE [2] | Mole percent vinylidene fluoride/PMVE [2] |
| 1 | 0.11 | 25.1 | 22/78 | 41/59 |
| 2 | 0.06 | 24.5 | 18/82 | 36/64 |
| 3 | 0.21 | 23.7 | 13/87 | 27/73 |

[1] Determined as described in Paragraph B.
[2] Perfluoromethyl perfluorovinyl ether.

The products of tubes 1 and 2 are still soft and the product of tube 3 is still flexible after 4–7 days at −15° C.

Any of the disclosed perfluoroalkyl perfluorovinyl ether units may be substituted in the preceding representative examples to give essentially the same results. In addition, these examples may be varied, within the scope of the total specification disclosure, as understood and practiced by one skilled in the art.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An elastomeric copolymer consisting of the following monomer units: (a) from 83 to 25 mol percent of vinylidene fluoride units (—CH₂—CF₂—) and (b) from 17 to 75 mol percent of perfluoroalkyl perfluorovinyl ether units having the structure

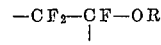

R being a perfluoroalkyl radical containing from one to three carbon atoms.

2. An elastomeric copolymer consisting of: (a) from 83 to 25 mol percent of vinylidene fluoride units and (b) from 17 to 75 mol percent of perfluoromethyl perfluorovinyl ether units.

3. An elastomeric vulcanizate prepared by subjecting the following to curing conditions: (I) a copolymer consisting of the following monomer units: (a) from 83 to 25 mol percent of vinylidene fluoride units (—CH₂—CF₂—)

and (b) from 17 to 75 mol percent of perfluoroalkyl perfluorovinyl ether units having the structure

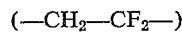

R being a perfluoroalkyl radical containing from one to three carbon atoms; (II) a curing agent; and (III) an acid acceptor.

4. An elastomeric copolymer consisting of the following monomer units: (a) from 80 to 72 mol percent of vinylidene fluoride units (—CH₂—CF₂—) and (b) from 20 to 28 mol percent of perfluoroalkyl perfluorovinyl ether units having the structure

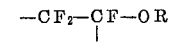

R being a perfluoroalkyl radical containing from one to three carbon atoms.

References Cited in the file of this patent

UNITED STATES PATENTS

| 2,799,712 | Croix et al. | July 16, 1957 |
| 2,917,548 | Dixon | Dec. 15, 1959 |
| 2,975,163 | Lo | Mar. 14, 1961 |
| 2,991,278 | Schildknecht | July 4, 1961 |